May 14, 1963
M. H. GROVE
3,089,678
VALVE CONSTRUCTION
Filed Aug. 24, 1960
3 Sheets-Sheet 1
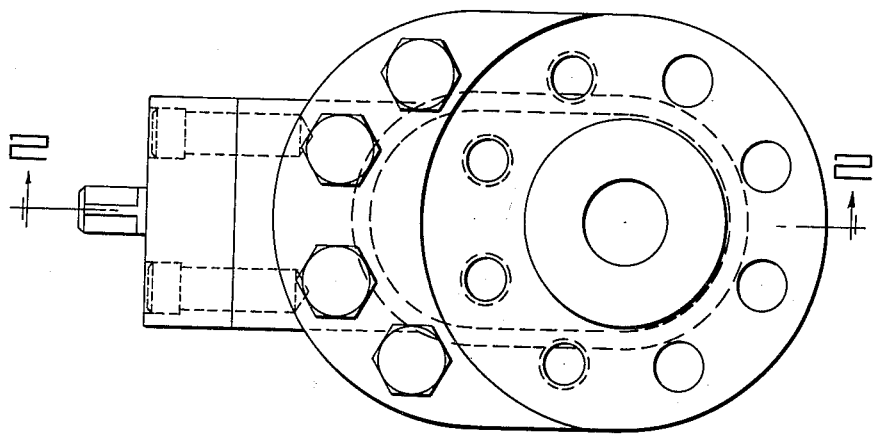
FIG_1_
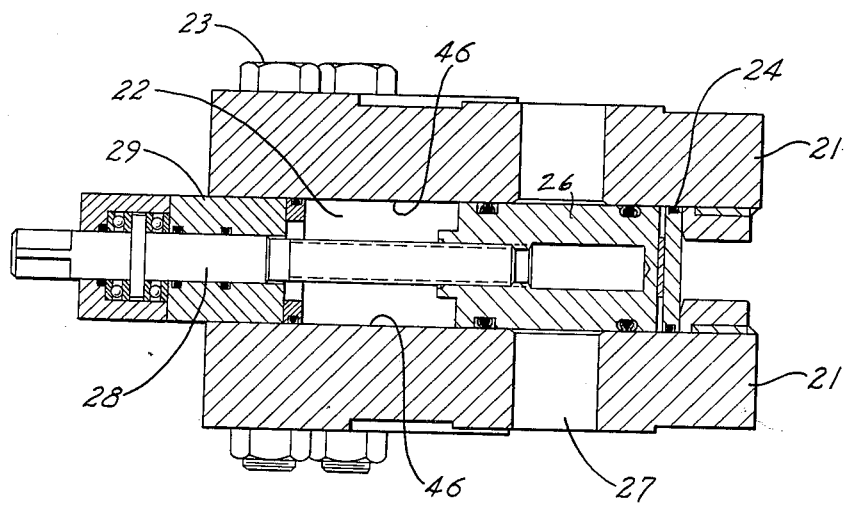
FIG_2_
INVENTOR.
Marvin H. Grove.
BY
*Flehr Swain*
ATTORNEYS.

May 14, 1963
M. H. GROVE
3,089,678
VALVE CONSTRUCTION
Filed Aug. 24, 1960
3 Sheets-Sheet 2
FIG_3_
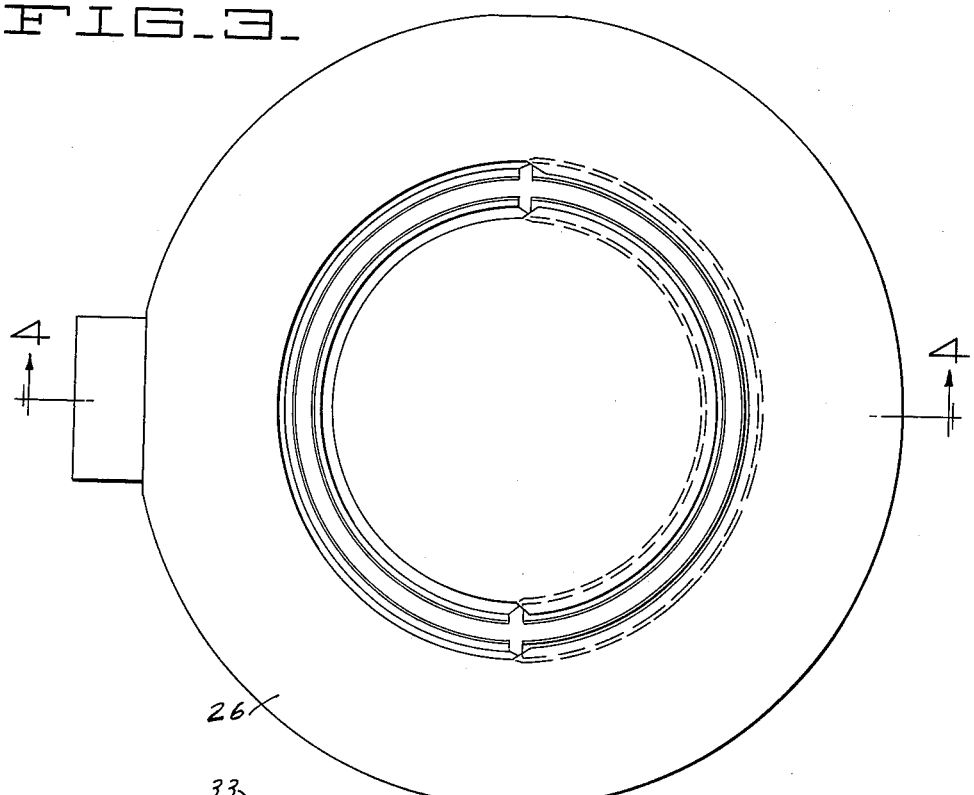
FIG_4_
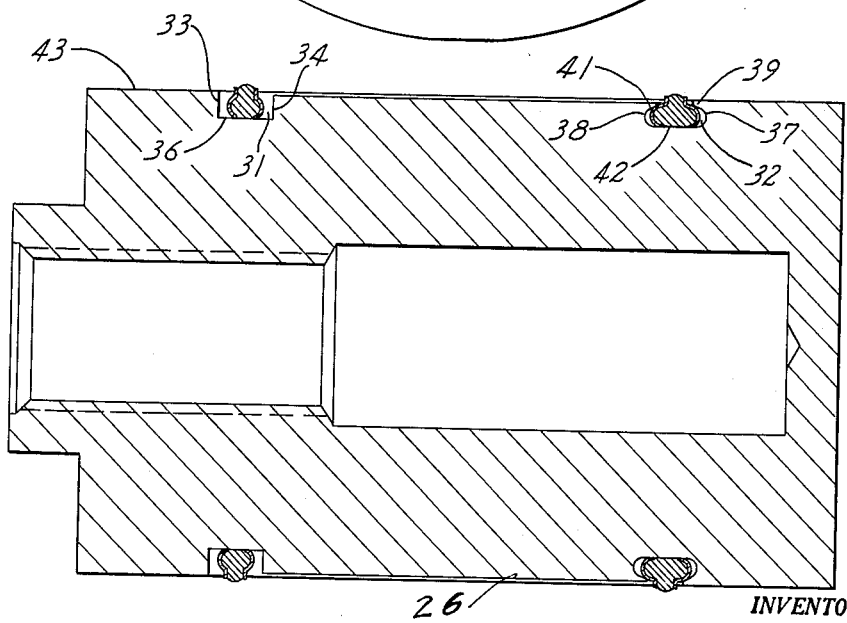
INVENTOR.
Marvin H. Grove.
BY
ATTORNEYS.

May 14, 1963  M. H. GROVE  3,089,678
VALVE CONSTRUCTION
Filed Aug. 24, 1960  3 Sheets-Sheet 3
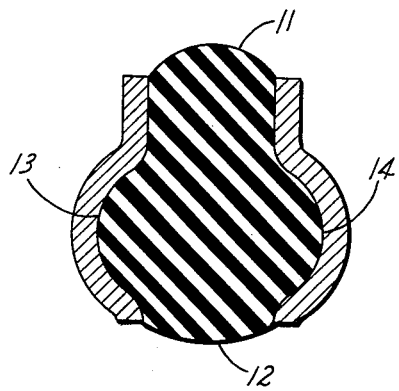
FIG_6_
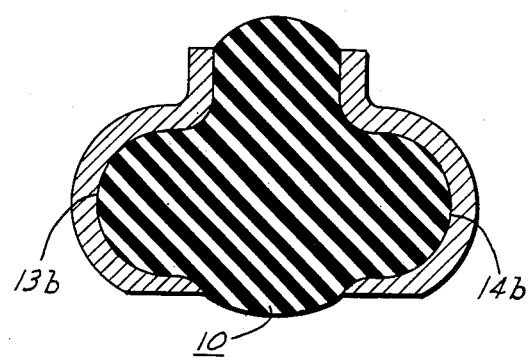
FIG_7_
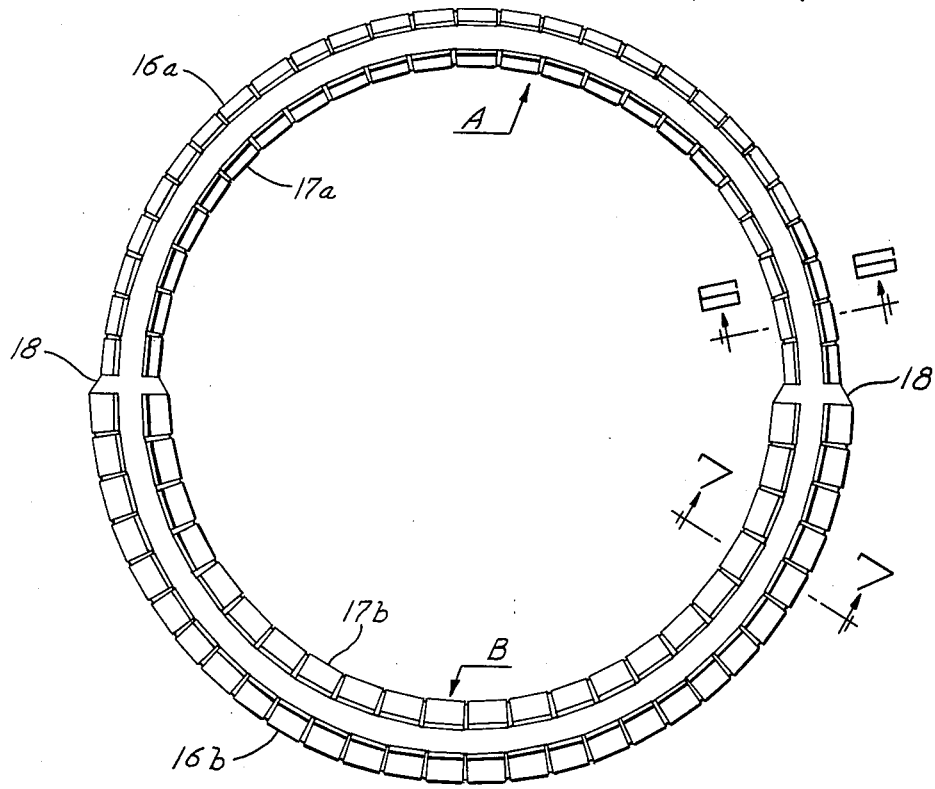
FIG_5_
INVENTOR.
Marvin H. Grove.
BY
ATTORNEYS.

United States Patent Office 3,089,678
Patented May 14, 1963

3,089,678
VALVE CONSTRUCTION
Marvin H. Grove, 340 Hillside Ave., Piedmont, Calif.
Filed Aug. 24, 1960, Ser. No. 51,623
9 Claims. (Cl. 251—327)

This invention relates generally to valves of the type having seal rings means formed of resilient material.

Various commercial valves utilize seal rings formed of resilient materials, such as synthetic rubber or plastic materials like Hycar, neoprene, nylon, Kel-F and Teflon. In some instances the seal ring may be mounted by bonding it into a groove carried by one of the valve parts. With this type of construction it is difficult to insure retention of the seal ring under all operating conditions, and when the seal ring is worn or mutilated, the entire mounting must be replaced. In some commercial structures the resilient seal ring is held in place by clamping pressure applied by cooperating parts, such as clamping rings. Such structures are relatively expensive to manufacture, and the constantly applied clamping pressure may cause cold flow and permanent deformation. As disclosed for example in Patent #2,810,543, some commercial valves have employed resilient seal rings of the O-ring type that are loosely held within grooves or recesses. Valves of this type have been quite successful, but have employed separable parts such as interfitting mounting and seat rings, forming the O-ring accommodating grooves or recesses.

In general it is an object of the present invention to provide a simple valve construction in which a resilient seal ring is held within an accommodating groove or recess in a novel manner.

Another object of the invention is to provide a valve of the above character which does not require the use of clamping rings or other separable parts for clamping or retaining the seal ring.

Another object of the invention is to provide a valve construction wherein a resilient seal ring can be readily installed or removed for replacement.

Further objects and features of the invention will appear from the following description in which the preferred embodiment has been set forth in detail in conjunction with the accompanying drawing.

Referring to the drawing:

FIGURE 1 is a front view illustrating a valve incorporating the present invention;

FIGURE 2 is a side elevational view in section and taken along the line 2—2 of FIGURE 1;

FIGURE 3 is a front view of a valve gate showing my seal ring installed within the same;

FIGURE 4 is a cross sectional view taken along the line 4—4 of FIGURE 3;

FIGURE 5 is a plan view of the seal ring used in my invention;

FIGURE 6 is a cross sectional view on an enlarged scale taken along the line 6—6 of FIGURE 5, and FIGURE 7 is a cross sectional view on an enlarged scale taken along the line 7—7 of FIGURE 5.

In accordance with the present invention I provide a seal ring having two arcuate portions, each with a different configuration in section. This seal ring is adapted to be accommodated in a special groove, which likewise has two arcuate sections, each with different configurations in section. The arrangement is such that the seal ring can be readily fitted within the groove when turned to a particular position, and thereafter it can be locked within the groove by rotating the ring through substantially 180°.

One construction for my special seal ring is shown in FIGURES 5-7. The main body 10 of the seal ring is formed of suitable resilient material, such as synthetic rubber or a suitable plastic elastomer. Particular reference can be made to such commercial materials as Hycar, neoprene, Kel-F, Teflon, and nylon. One arcuate portion of this body, indicated by A in FIGURE 5, has a configuration such as shown in FIGURE 6, and the other arcuate portion B has the configuration shown in FIGURE 7. Both of these configurations have smooth end surfaces 11 and 12, which are adapted to engage and form sealing contacts with adjacent metal surfaces, as will be presently explained. The configuration of FIGURE 6 has outer and inner rib-like portions 13 and 14. The corresponding portions 13b and 14b of FIGURE 7 are considerably extended thereby forming a greater overall radial width.

It is desirable to provide the two arcuate portions of the seal ring with spring metal sheathing. The sheathing for arcuate portion A is designated 16a and 17a, and consists of thin spring metal fingers that are bonded to the outer and inner peripheries of the resilient rubber body. The arcuate ring portion B likewise has similar sheathing 16b and 17b. The short tapered transitional portions 18 are integral with the resilient body, and serve to join the two arcuate portions.

FIGURES 1 and 2 show a gate valve in which the above described seal ring may be installed. The body of this valve is formed from the side body parts 21, which are separated by the intermediate body part 22, the three body parts being clamped together by bolts 23. Suitable means such as seal rings 24 of the resilient O-ring type, prevent leakage between the body parts. The simple valve gate 26 operates between the opposed inner surfaces of the body parts 21, and moves between open and closed positions relative to the body passages 27. The gate operating means shown by way of example includes the rotatable valve stem 28, which has threaded engagement with the gate and which extends through the bonnet block 29.

The sides of the gate are provided with grooves formed substantially as shown in FIGURES 3 and 4. Each groove consists of two arcuate portions 31 and 32, each portion being substantially 180° in extent and having a different configuration in section. The groove portion 31 has substantially parallel inner and outer defining surfaces 33 and 34, and a flat bottom surface 36, that is at right angles to the surfaces 33 and 34. The groove portion 32 is undercut whereby its outer and inner peripheral defining surfaces 37 and 38 are concave, thereby providing radially spaced lips 39 and 41. The narrowest portion of this second groove portion 32 is thus between lips 39, 41. Inward thereof in an axial direction the radial width of the groove 32 is greater and is equal to that of the first groove portion 31. Bottom surface 42 is flat and in the same plane as the surface 36. Both surfaces 36 and 42 are parallel to the side face 43 of the gate. It will be seen from FIGURE 4 that the radial width between the surfaces 33 and 34 is slightly greater than the radial width of the arcuate seal ring portion B. Also the radial spacing between the lips 39 and 41 is slightly greater than or comparable to the radial width of the arcuate portion A of the seal ring. The radial spacing between lips 39 and 41 is substantially less than the overall width of the arcuate portion B of the seal ring.

Installation of my seal ring into a valve gate or like valve member is as follows: The seal ring is first brought into proximity with the groove, and rotated until its arcuate portion B immediately overlies the groove portion 31, with the arcuate portion A overlying the lips 39 and 41. The seal ring can now be inserted into the groove, because of the dimensioning described above. After insertion the seal ring is turned through about 180°, whereby the wider arcuate portion B is transposed into the groove portion 32, and underneath the retaining lips 39 and 41. When both of the seal rings have been applied, the gate is installed within the valve body in the manner illustrated in FIGURE 2. The spacing between the body parts 21 is such that when installed, the seal ring is squeezed whereby surfaces 11 contact and make sealing engagement with the inner opposed side surfaces 46 of the body parts 21, and the surfaces 12 of the seal rings are urged into sealing engagement with the bottom surfaces 36 and 42 of the grooves. In other words, as initially installed, and without application of line pressure, both of the seal rings are somewhat squeezed or compressed, whereby sealing contact is maintained upon both the upstream and downstream sides. The spring metal sheaths provide spring action which tends to maintain the desired sealing contacts. Also these sheaths tend to prevent cold flow or permanent deformation of the resilient material.

Assuming that line pressure is applied to the valve, the gate can be moved between open and closed positions for controlling the flow as desired. The only parts of each seal ring that are exposed to the line are the arcuate portions B, which as previously explained are locked beneath the lips 39 and 41. The arcuate portions A, which are not locked within the grooves, are at all times retained within the grooves by virtue of being in contact with the surfaces 46 of the body.

It will be evident from the foregoing that I have provided a novel seal ring construction which can be installed without the use of separate clamping or retaining parts. Thus my valve construction utilizing my ring can be manufactured at relatively low cost. The seal ring can be constructed from a wide variety of materials, to suit various operating conditions. For some services (e.g., low pressure service) the spring metal sheathing may be omitted.

I claim:

1. In a valve construction, a body means having a flow passage, a valve means movable between open and closed positions relative to the flow passage, one of said last named means forming a valve working surface surrounding the flow passage and the other of said means having a second surface disposed in close proximity with the valve working surface for closed position of the valve, a seal ring formed of resilient material, one arcuate portion of said seal ring as viewed in section having a radial width substantially greater than the remaining arcuate portion, said other means having a groove interrupting said second surface and serving to accommodate the seal ring, one arcuate portion of the groove as viewed in section being formed to provide seal ring retaining lips and the remaining arcuate portion of the groove being without such lips, both arcuate portions of the groove having a radial width at least equal to the radial width of the first named arcuate portion of the seal ring, and the radial spacing between said lips being at least comparable to the radial width of the second named arcuate portion of the seal ring, said seal ring being capable of rotation within said groove to bring the first named arcuate portion into that portion of the groove that is not provided with retaining lips, whereby the seal ring can be removed.

2. A valve as in claim 1 in which the seal ring is provided with spring metal sheathing.

3. A valve as in claim 1 in which each of the said arcuate portions is substantially 180° in length.

4. A valve construction as in claim 1 in which movable valve means is a valve gate.

5. In a valve construction, a body means having flow passages extending therethrough, a valve means movable between open and closed positions relative to the flow passages, one of said means forming a valve working surface surrounding the flow passage and the other of said means having a second surface disposed in close proximity with the valve working surface for closed position of the valve, a seal ring formed of resilient material, said other means having an annular groove in said second surface serving to accommodate said seal ring, said seal ring having at least two ring portions, one said ring portion having a larger radial width in cross-section than a second ring portion, said groove being formed with at least two portions of different configurations in radial cross-section, one said groove portion having a radial width substantially equal at its narrowest dimension to the radial width of said one ring portion, a second groove portion having a radial width at its narrowest dimension substantially equal to the radial width of said second ring portion and having a radial width spaced inwardly of said narrowest dimension in an axial direction substantially equal to the radial width of said first ring portion, said radial width at the narrowest dimension of said second groove portion being defined by annular lips extending inwardly from both marginal edges of said second groove portion, said ring being removable from said groove by turning said ring so that said first ring portion is located within said first groove portion and said second ring portion is located within said second groove portion.

6. A valve construction as in claim 5 in which spring metal sheath means is provided on the resilient seal ring.

7. A valve construction as in claim 5 in which said other valve means is in the form of a valve gate having said groove in one side of the same.

8. A seal ring for the purpose described having a ring shaped body formed of resilient material, said body having a first and a second arcuate portion each having smooth, convex top and bottom sealing surfaces spaced apart equal distances for each said portion, said first portion having inward and outward radially extending convex first rib portions, said second portion having inward and outward radially extending second rib portions, the distance between the outer edges of said first rib portions being substantially greater than the distance between the outer edges of said second rib portions.

9. A seal ring comprising a ring-shaped body formed of resilient material having surfaces on its opposite sides for making sealing contacts, two arcuate portions of the ring being different in radial width and spring metal sheathing bonded to the inner and outer peripheral surfaces of the ring, the narrower one of said portions being of a circumferential length substantially greater than its width.

References Cited in the file of this patent

UNITED STATES PATENTS

| 683,695 | Lundbom | Oct. 1, 1901 |
| 2,859,767 | Tschudi et al. | Nov. 11, 1958 |
| 2,908,480 | Hamer | Oct. 13, 1959 |
| 2,985,422 | Anderson et al. | May 23, 1961 |

FOREIGN PATENTS

| 19,822 | France | May 20, 1915 |
| | (Addition) | |